United States Patent [19]

Austin

[11] 4,264,028
[45] Apr. 28, 1981

[54] LOCKING MECHANISM FOR A TRIGGER OF A FASTENER DRIVING TOOL

[75] Inventor: Ronald Austin, Hazelcrest, Ill.

[73] Assignee: Duo-Fast Corporation, Franklin Park, Ill.

[21] Appl. No.: 35,498

[22] Filed: May 3, 1979

[51] Int. Cl.³ .............................................. B25C 7/00
[52] U.S. Cl. ...................................................... 227/8
[58] Field of Search ........................... 173/169; 227/8; 42/1 LP

[56] References Cited

U.S. PATENT DOCUMENTS

| 3,011,169 | 12/1961 | Cast et al. | 227/8 |
| 3,056,965 | 10/1962 | Rogers | 227/8 |
| 3,464,614 | 9/1969 | Volkmann | 227/8 |
| 3,510,099 | 5/1970 | Crump | 173/169 |
| 3,519,186 | 7/1970 | Volkmann | 227/8 |

Primary Examiner—John McQuade
Attorney, Agent, or Firm—Mason, Kolehmainen, Rathburn & Wyss

[57] ABSTRACT

A fastener driving tool includes a driver and a mechanism for powering the driver through a driving stroke including a trigger pivotally mounted on the tool and adapted for actuation by the finger of an operator. A locking mechanism is included on the tool that is movable from a first position preventing the pivoting of the trigger to a second position wherein the trigger may be pivoted and released a predetermined distance to allow repeated firing of the tool.

17 Claims, 7 Drawing Figures

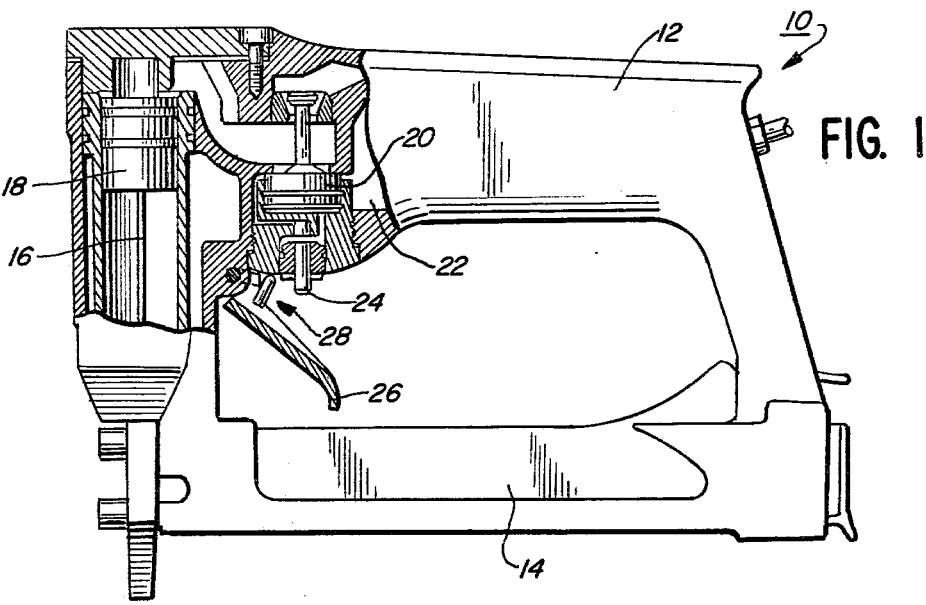
FIG. 1
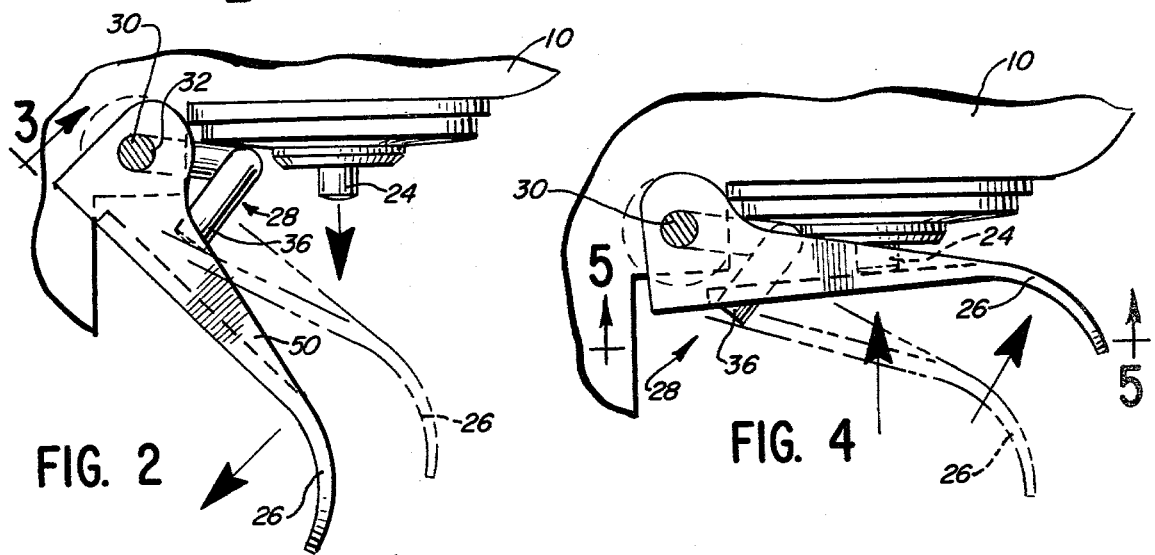
FIG. 2
FIG. 4
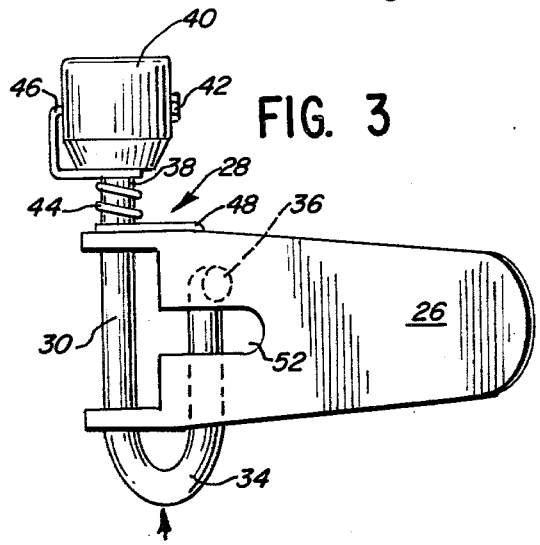
FIG. 3
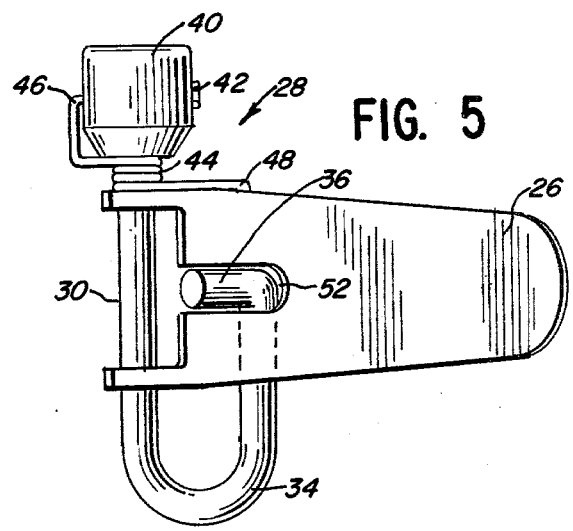
FIG. 5

4,264,028

LOCKING MECHANISM FOR A TRIGGER OF A FASTENER DRIVING TOOL

BACKGROUND OF THE INVENTION

A. Field Of The Invention

The present invention generally relates to a new and improved apparatus for locking the trigger of a fastener driving tool to prevent the firing thereof.

B. The Description Of The Prior Art

Fastener driving tools powered by pressurized fluid or electricity and employed for driving fasteners into a workpiece can be dangerous to the operator unless they include a safety of a type to prevent misfiring of the tool. To provide the safety feature necessary, several tool disabling or safety devices are used in the prior art.

One type of prior art safety device requires that the tool be placed onto the workpiece before the tool is actuated into an operative mode to allow driving of a fastener. Another type of prior art structure includes a toggle mechanism secured at one end of the tool and at the other end to the trigger. In the extended at-rest position of the toggle, the trigger cannot be pivoted to fire the tool. In order to pivot the trigger, the operator must apply pressure to the joint or knee of the toggle causing it to collapse allowing pivoting of the trigger. This latter type of prior art safety or locking mechanism is awkward to manipulate and may require two hands to operate the safety mechanism and fire the tool.

SUMMARY OF THE INVENTION

An object of the present invention is to provide a new and improved fastener driving tool.

Another object of the present invention is to provide a new and improved mechanism for locking the trigger of a fastener driving tool.

A further object of the present invention is to provide a new and improved mechanism for locking the trigger of a fastener driving tool into an inoperative position that is actuable by the operator of the tool to a non-locking position to allow firing of the tool.

The present invention is directed to a new and improved safety mechanism intended to lock the trigger of a fastener driving tool into an inoperative position so that the tool may not be inadvertently fired. The fastener driving tool of the present invention includes a driver that is powered through a driving stroke by pressurized fluid or electricity that is initiated by pivoting the trigger included on the tool.

The safety device of the present invention includes a pin slideably mounted on the tool with an end thereof that in a first position engages the trigger and prevents pivoting. In order to fire the tool, the pin must be moved relative to the tool to a second position wherein the end extends through an aperture in the trigger which allows pivoting of the trigger to fire the tool. To allow repeating firing of the tool, the first end of the pin is of sufficient length that the trigger may be pivoted a predetermined distance without the pin moving out of the aperture thereby allowing repeated pivoting of the trigger and repeated firing of the tool.

BRIEF DESCRIPTION OF THE DRAWINGS

The above and other objects and advantages and novel features of the present invention will become apparent from the following detailed description of the preferred embodiments of the invention illustrated in the accompanying drawings wherein:

FIG. 1 is a partially cut away view of a fastener driving tool including a safety or trigger lock mechanism constructed in accordance with the principles of the present invention;

FIG. 2 is an enlarged view of the trigger and the trigger lock mechanism in the at-rest or normal position;

FIG. 3 is a view taken along line 3—3 of FIG. 2;

FIG. 4 is a view similar to FIG. 2 with the trigger in the tool firing position;

FIG. 5 is a view taken along line 5—5 of FIG. 4;

DETAILED DESCRIPTION OF THE PREFERRED EMBODIMENTS

Figure 6:
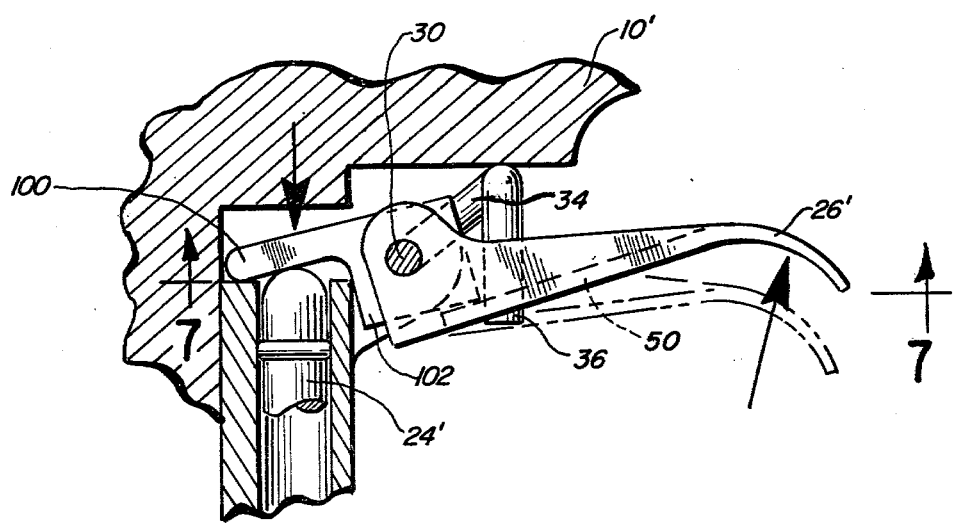
FIG. 6 is a view of an alternative embodiment of a trigger and safety or trigger lock mechanism with the trigger in the tool firing position; and, FIG. 7 is a view taken along line 7—7 of FIG. 6.

Having reference to the drawings and initially to FIG. 1, there is illustrated a fastener driving tool generally designated by the reference numeral 10. The fastener driving tool 10 may be employed to drive fasteners into a workpiece and is powered either by pressurized fluid as is the tool 10 of FIG. 1, or by other means such as electricity. Since the tool 10 may be one of several types well known in the art, it will only be briefly described.

The tool 10 includes a handle portion 12 and a magazine assembly 14 in which fasteners such as staples are stored. Fasteners are driven into a workpiece by a driver 16 that is moved through a driving stroke by a piston 18 under the influence of, in the preferred embodiment illustrated, compressed air. Compressed air is introduced above the piston 18 to power the driver through a driving stroke by an actuating valve 20 that in the position illustrated in FIG. 1, prevents the passage of pressurized fluid from the reservoir 22 to above the piston 18.

In order to fire the tool 10, the valve 20 must be moved upwardly to a second position to allow the passage of compressed air from the reservoir 22 to above the piston 18. Movement of the valve 20 is accomplished by a pin 24 that at one end engages the valve and at a second end is adapted to be engaged by a trigger 26 that is pivotally mounted on the tool 10. Consequently, to actuate the tool 10 and move the driver 16 through a fastener driving stroke, the trigger 26 is pivoted by the operator of the tool 10 to engage the pin 24 whereupon the valve 20 is moved to the second position communicating pressurized fluid from the reservoir 22 to above the piston 18.

To insure against misfiring of the tool 10, it is preferred that a safety arrangement be provided that prevents inadvertent actuation or pivoting of the trigger 26. This is accomplished through the trigger locking mechanism generally designated by the reference numeral 28. As best illustrated in FIGS. 2 and 3 the trigger locking mechanism includes a pin 30 mounted in the tool 10 and extending transversely through apertures 32 defined in the trigger 26 to mount the trigger pivotally onto the tool The pin 30 is looped upon itself and defines a bend 34 and a first end 36. A second end 38 of the pin 30 extends outwardly from the side of the tool 10 and includes a button 40 adapted to be engaged by the thumb of the operator of the tool 10. The button 40 may be secured to the second end 38 of the pin 30 by means well known in the art such as a press fit or a set screw 42.

Spirally wrapped around the end 38 of the pin 30 is a torsion-compression spring 44 that includes a first end 46 secured to the button 40 and a second end 48 that extends over a flange portion 50 of the trigger 26 and functions to bias the trigger 26 to the downward position as illustrated in solid lines in FIG. 2. The spring 44 also serves to bias the pin 30 to a first position best illustrated in FIG. 3 (see also FIG. 2) wherein the end 36 of the pin 30 engages the trigger 26 thereby locking or holding the trigger 26 in its inoperative or downward position and preventing pivoting of the trigger 26 beyond the position illustrated by phantom lines in FIG. 2.

The trigger 26 includes a central aperture or slot 52 such that the operator of the tool 10, by the use of his thumb, may press against the button 40 moving the pin 30 transversely relative to the tool 10 against the compressive force of the spring 44. This movement also moves the end 36 relative to the trigger 26 to a second position whereupon the end 36 extends through the aperture 52. Once the second position of the pin 30 is attained, the operator of the tool 10 may pivot the trigger 26 through the use of his index finger as illustrated in FIGS. 4 and 5 of the drawings. In this position, the trigger 26 may be pivoted to engage the pin 24 to fire the tool. If the trigger 26 is then released, or allowed to return to its at-rest or initial position, the trigger 26 will return under the influence of the spring 44 to a position whereupon the end 36 of the pin 30 will be out of the slot 52 and the spring 44 will bias the pin 30 to its first position as illustrated in FIG. 3 whereupon the trigger 26 is again locked in its inoperative position.

In the alternative, once the operator has fired the tool 10 and the trigger 26 is in the position illustrated in FIG. 4, the operator may partially release the trigger 26 to a position illustrated by phantom lines in FIG. 4 whereupon the pin 24 is no longer engaged yet the trigger 26 has not pivoted to a position where the end 36 of the pine 30 is completely removed from the aperture 52. Thereafter, the operator may again pivot the trigger 26 to the position illustrated by solid lines in FIG. 4 again engaging the pin 24 and firing the tool. Thus, repeated firings of the tool 10 may be accomplished without having to release the trigger 26. As can be understood, the end 36 of the pin 30 is of a predetermined length to allow this repeated firing.

Figure 7:
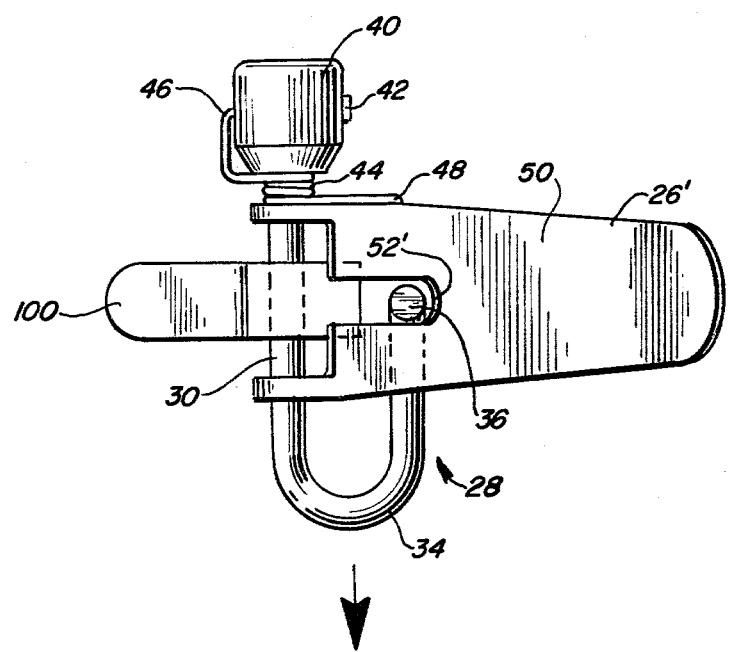

In an alternative embodiment of the present invention illustrated in FIGS. 6 and 7 of the drawings, the trigger 26' includes a nose position 100 that extends forwardly of the trigger 26' and engages a pin 24' that actuates the tool 10' in the same manner that the pin 24 actuates the tool 10 in FIGS. 1-5. In this embodiment, trigger 26' includes a central aperture 52' and the locking assembly 28 functions in the same manner and is of the same construction as the locking mechanism illustrated in FIGS. 1-5, except for the fact that the forward extending portion 100 of the trigger 26' includes side flanges 102 with apertures through which the pin 30 passes. The structure, however, is functionally the same, and the operation thereof is the same as the previous embodiment described.

Many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. In a fastener driving tool including a driver, means for driving said driver and a trigger for actuating said driving means, a mechanism for locking said trigger in an inoperative position comprising a pin slideably mounted on said tool, said pin in a first position engaging a surface of said trigger to prevent operation thereof and in a second position wherein said trigger is operational, and means in said trigger surface for receiving said pin to allow operation of said trigger and allowing repeated operation of said trigger upon release of said trigger a predetermined distance wherein said distance is less than the distance necessary to allow said pin to return to said first position.

2. The tool claimed in claim 1 wherein said trigger includes an aperture, said pin including a first end engaging said trigger in said first position and aligned with said aperture in said second position.

3. The tool claimed in claim 2 wherein during actuation of said trigger said first end extends through said aperture a predetermined distance in said second position to allow repeated actuation of said trigger without allowing said pin to return to said first position.

4. The tool claimed in claim 1 wherein said pin is mounted on said tool for transverse movement relative to said trigger.

5. The tool claimed in claim 1 further comprising means for biasing said pin to said first position.

6. In a fastener driving tool including a trigger pivotally mounted thereon for actuating said tool, an apparatus for locking said trigger comprising
   a locking member slideably mounted on said tool and including a first end,
   said trigger including an aperture defined therein,
   said locking member movable from a first position wherein said first end engages said trigger to prevent pivoting thereof to a second position wherein said first end is aligned with said aperture to allow pivoting of said trigger to fire said tool.

7. The apparatus of the tool set forth in claim 6 further comprising means biasing said locking member to said first position.

8. The apparatus of the tool set forth in claim 6 wherein said first end of said locking member is of a predetermined length to allow repeated pivoting of said trigger and firing of said tool with said first end remaining in said aperture.

9. The apparatus of the tool set forth in claim 6 wherein said locking member is mounted on said tool for movement transversely to said trigger.

10. The apparatus of the tool set forth in claim 6 wherein said locking member further comprises a first portion abutting said tool upon engagement of said first end of said locking member with said trigger in said first position to prevent pivoting of said trigger.

11. In a fastener driving tool including a driver, means for driving said driver and a trigger for actuating said driving means, a mechanism for locking said trigger in an inoperative position comprising a pin slideably mounted on said tool, said pin in a first position engaging said trigger to prevent operation thereof and in a second position allowing operation of said trigger, said trigger includes an aperture, said pin including a first end engaging said trigger in said first position and aligned with said aperture in said second position.

12. The tool claimed in claim 11 wherein said first end is aligned with said aperture a predetermined distance in said second position to allow repeated actuation of said trigger without allowing said pin to return to said first position.

13. The tool claimed in claim 11 wherein said pin is mounted on said tool for transverse movement relative to said trigger.

14. The tool claimed in claim 11 further comprising means for biasing said pin to said first position.

15. In a fastener driving tool including a driver for driving fasteners and means for moving said driver through a driving stroke, said moving means including a manually actuated trigger pivotally mounted on said tool, a trigger locking assembly comprising a trigger engaging member slideably mounted on said tool, and means for biasing said engaging member to a first position wherein said engaging member engages said trigger to prevent pivoting thereof, said engaging member slideable to a second position out of engagement with said trigger to allow pivoting thereof, said trigger engaging member comprises a pin, said trigger includes an aperture and said pin includes a first end that in said first position engages said trigger and in said second position is aligned with said aperture.

16. The tool claimed in claim 15 wherein said first end is of a predetermined length to allow repeated pivoting of said trigger without said first end of said pin being withdrawn from said aperture.

17. The tool claimed in claim 15 wherein said engaging member is mounted on said tool for movement transversely to said trigger.

* * * * *